(12) United States Patent
Eckel et al.

(10) Patent No.: US 9,212,721 B2
(45) Date of Patent: Dec. 15, 2015

(54) HYDROMOUNT

(71) Applicant: TrelleborgVibracoustic GmbH, Darmstadt (DE)

(72) Inventors: Hans-Gerd Eckel, Laudenbach (DE); Bernhard Roehrig, Heppenheim (DE)

(73) Assignee: TRELLEBORGVIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 14/462,653

(22) Filed: Aug. 19, 2014

(65) Prior Publication Data
US 2015/0054209 A1   Feb. 26, 2015

(30) Foreign Application Priority Data

Aug. 20, 2013   (DE) .................. 10 2013 109 006

(51) Int. Cl.
| | | |
|---|---|---|
| *F16F 13/10* | (2006.01) | |
| *F16F 13/26* | (2006.01) | |
| *F16F 13/08* | (2006.01) | |

(52) U.S. Cl.
CPC ............... *F16F 13/26* (2013.01); *F16F 13/08* (2013.01); *F16F 13/10* (2013.01); *F16F 13/266* (2013.01)

(58) Field of Classification Search
CPC ........... F16F 13/06; F16F 13/18; F16F 13/10; F16F 13/102; F16F 13/105–13/107; F16F 13/26
See application file for complete search history.

(56) References Cited

U.S. PATENT DOCUMENTS

| 5,462,261 | A | 10/1995 | Eckel | |
|---|---|---|---|---|
| 6,276,672 | B1 | 8/2001 | Rudolf et al. | |
| 2002/0036372 | A1* | 3/2002 | Goto et al. | 267/140.14 |
| 2005/0275145 | A1* | 12/2005 | Muraoka et al. | 267/140.14 |
| 2007/0138719 | A1* | 6/2007 | Ichikawa et al. | 267/140.14 |
| 2010/0301530 | A1* | 12/2010 | Koyama et al. | 267/140.14 |
| 2012/0242019 | A1* | 9/2012 | Koyama et al. | 267/140.14 |
| 2013/0161885 | A1 | 6/2013 | Marienfeld et al. | |

FOREIGN PATENT DOCUMENTS

| DE | 4330560 | C1 | | 11/1994 |
|---|---|---|---|---|
| DE | 19807868 | A1 | | 9/1999 |
| DE | 19902493 | C2 | | 7/2000 |
| DE | 102010060885 | A1 | | 3/2012 |
| DE | 102011088924 | A1 | * | 6/2013 |
| EP | 1688639 | B1 | | 8/2006 |
| EP | 2028392 | B1 | | 12/2010 |
| EP | 2698559 | A1 | | 2/2014 |
| EP | 2698560 | A1 | | 2/2014 |

* cited by examiner

*Primary Examiner* — Anna Momper
(74) *Attorney, Agent, or Firm* — Leydig, Voit & Mayer, Ltd.

(57) ABSTRACT

A hydromount comprising a carrying mount and a support mount connected to each other by an elastomeric suspension spring. The hydromount includes a working chamber and a compensation chamber that are filled with a fluid and separated by a partition, and connected to each other via a damping channel inserted into the partition. The hydromount includes an absorber channel that is switchable via an actuating device. The absorber channel is inactive in a first switching position of the actuating device and active in a second switching position of the actuating device. The actuating device has an electrically drivable electromagnet and an armature suspended via an elastic membrane so as to allow the armature to vibrate. The membrane is surrounded by a limiting member such that the membrane abuts against the limiting member in the first switching position and is spaced from the limiting member in the second switching position.

12 Claims, 1 Drawing Sheet

HYDROMOUNT

CROSS-REFERENCE TO RELATED APPLICATIONS

This application claims priority from German Patent Application No. DE 10 2013 109 006.0, filed Aug. 20, 2013, which is hereby incorporated by reference herein in its entirety.

FIELD

The present invention relates to a hydromount, in particular a switchable hydromount, comprising a carrying mount and a support mount, which are connected to each other by an elastomeric suspension spring, a working chamber and a compensation chamber, which are filled with a fluid and are separated from each other by a partition and connected to each other via a damping channel inserted into the partition, and an absorber channel, which is switchable via an actuating device, wherein the absorber channel is inactive in a first switching position of the actuating device and the absorber channel is active in a second switching position of the actuating device, and wherein the actuating device has an electrically drivable electromagnet and an armature which is suspended by means of an elastic membrane in a manner capable of vibrating.

BACKGROUND

Mounts of the aforementioned type are used for mounting motor vehicle assemblies in order to dampen or absorb vibrations occurring during operation. In this case, the hydromount has several damping or absorbing systems that achieve a damping or absorbing effect at different excitation frequencies. For example, the suspension spring consisting of an elastomeric material effects an acoustic insulation. A damping of low-frequency vibrations with a large amplitude is carried out via the damping channel. In the process, the introduced vibrations result in a movement of the suspension spring, whereby a hydraulic pressure is built up within the working chamber. Due to the pressure, the fluid flows from the working chamber via the damping channel into the compensation chamber. Due to the small diameter of the damping channel and the high mechanical transmission associated therewith, which results from the equivalent displacing cross section of the suspension spring in relation to the damping channel cross section, the introduced vibrations are absorbed or damped.

In order to decouple high-frequency, low-amplitude vibrations, i.e. in the acoustically relevant area, the introduction of an elastic membrane with or without play within the partition is known. In this case, the membrane vibrates at high-frequency, low-amplitude vibrations, so that a damping action is decoupled via the damping channel.

Furthermore, it is known to introduce into the partition a through-hole or a channel, which can also be referred to as idling channel or absorber channel, and which can be unblocked and closed by means of a switchable actuating device, in order to reduce the dynamic bearing rigidity during the idling of the engine. Such mounts are also referred to as switchable mounts. Depending on the engine speed, the channel is opened or closed. In the case of a closed channel, the mount works like a conventional mount, in which low-frequency vibrations with high amplitudes are damped by a liquid displacement within the damping channel and high-frequency vibrations with low amplitudes are insulated or decoupled by means of the membrane. In the open position of the channel, a liquid column oscillates within the channel, so that the high-frequency engine vibrations occurring during engine idling are transmitted to the chassis in a significantly reduced form due to the small effective spring rate.

Hydromounts of this type are known from DE 43 30 560 C1 and EP 1 688 639 B1. Here, switchable hydromounts are disclosed whose idling channel can be opened or closed by means of an actuating device to which a negative pressure can be applied.

In this case, it is disadvantageous that an energy supply with negative pressure is not available in a sufficient quantity in modern motor vehicles, particularly in motor vehicles with hybrid or electric drives.

In order to circumvent this drawback, a hydromount is presented in EP 2 028 392 B1 whose actuating device is switchable via an electrically drivable electromagnet. Here, in order to form an absorber channel, an opening is introduced into a partition which is delimited in an axially downward direction by a pot-shaped support wall and an electromagnet. A partially flexible membrane, which is at least partially made from a magnetizable elastomer or provided with a metal part, extends into the absorber channel in a sack-like manner. By applying a current to the electromagnet, the membrane abuts against the support wall and the electromagnet, so that the absorber channel is inactive. In order to activate the absorber channel, the current supply to the electromagnet is interrupted. Thus, the membrane is spaced from the electromagnet and is able to vibrate with the liquid column located in the absorber channel against the vibrations introduced in the axial direction. What is disadvantageous in this case is that, due to the pot-shaped configuration of the support wall, the membrane abuts against the support wall when the absorber channel is active. As a consequence, the expanding-spring rate of the membrane is not effective. This results in a lower mechanical transmission, so that the dynamic spring rate of the hydromount in engine idling is not lowered to a sufficient extent.

SUMMARY

In an embodiment, the present invention provides a hydromount comprising a carrying mount and a support mount connected to each other by an elastomeric suspension spring. The hydromount includes a working chamber and a compensation chamber that are filled with a fluid and separated by a partition, and connected to each other via a damping channel inserted into the partition. The hydromount includes an absorber channel that is switchable via an actuating device. The absorber channel is inactive in a first switching position of the actuating device and active in a second switching position of the actuating device. The actuating device has an electrically drivable electromagnet and an armature suspended via an elastic membrane so as to allow the armature to vibrate. The membrane is surrounded by a limiting member such that the membrane abuts against the limiting member in the first switching position and is spaced from the limiting member in the second switching position.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figures 1, 2:
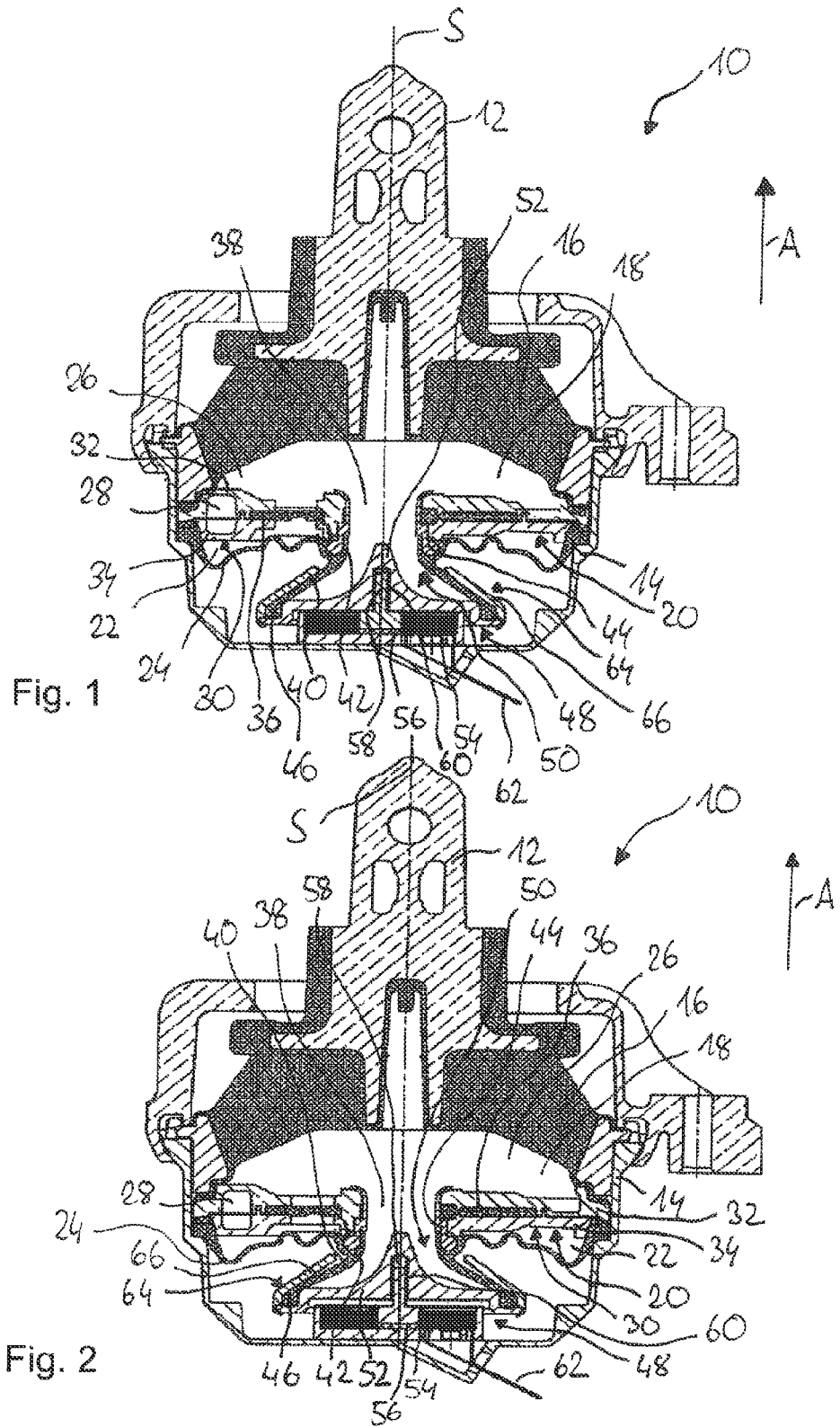
FIG. 1 is a cross section through the hydromount according to the invention in the first switching state.
FIG. 2 is a cross section through the hydromount according to the invention in the second switching state.

An aspect of the present invention is developing a hydromount in which the dynamic spring rate of the hydromount during the idling of the engine is considerably lowered at the most important exciting frequencies.

In the hydromount according to the invention, the membrane is surrounded by a limiting member configured in such a way that the membrane abuts against the limiting member in the first switching position and is spaced from the limiting member in a second switching position. In the first switching state, i.e. during drive operation, the membrane, which may also be referred to as an absorber spring, abuts against the limiting member and is therefore unable to vibrate in a resonant manner. Thus, the volume compliance of the absorber spring is disabled, so that the bearing behavior of a conventional hydromount is obtained, wherein damping takes place by means of a liquid exchange between the working chamber and the compensation chamber via the damping channel. In particular, the absorber spring, due to being abutted against the limiting member, has no influence on the damping of the vibrations occurring outside the idling of the engine, such as, for example, for judder damping.

In order to damp or absorb the high-frequency vibrations occurring during engine idling, the absorber channel is activated by driving the electromagnet. The armature thus disengages from the magnet and is suspended from the membrane within the hydromount in a manner capable of vibrating. This mode corresponds to the second switching state. Thus, both the axial spring rate of the absorber spring parallel to the axis of symmetry of the hydromount and the expanding-spring rate of the absorber spring are effective. In this case, the first absorber mass is formed by the fluid mass in the absorber channel, and the second absorber mass corresponds to the armature. The first natural absorber frequency of the first absorber mass is derived from the fluid mass in the absorber channel, the expanding-spring rate of the suspension spring and the expanding-spring rate of the absorber spring. The second natural absorber frequency of the second absorber mass is derived from the axial spring rate of the absorber spring and the mass of the armature.

In this case, the natural absorber frequencies can be adjusted in such a way that the dynamic spring rate of the hydromount during the idling of the engine is considerably lowered at the most important exciting frequencies. For example, these frequencies, in a six-cylinder engine of the third and sixth order and in a four-cylinder engine of the second and fourth order, are 35 to 40 Hz and 70 to 80 Hz.

Furthermore, the axial spring rate of the absorber spring and its expanding-spring rate are subject to mechanical transmission. The mechanical transmission results from the relation of the hydraulic effective area of the suspension spring to the hydraulic effective area of the absorber spring. Transmissions in coupled mechanical systems are effective with the square of the transmission ratio. In the present case, the square of the transmission ratio is approximately between 80 and 120, preferably approximately 100. Thus, a high effective level of the vibrating absorber masses is obtained, so that the high-frequency vibrations occurring during idling are absorbed. Thus, the dynamic spring rate of the hydromount during idling can be lowered considerably at the most important exciting frequencies. Furthermore, there is no need to compromise between the axial spring rate of the absorber spring and its expanding-spring rate.

The engine-excited frequencies typical for idling that are at issue here are approx. 20 Hz to 40 Hz, with the excitation amplitude being approx. between 0.1 mm and 0.3 mm. In the case of damping, i.e. for high amplitudes excited by the road, the frequencies are approx. 10 Hz, and the excitation amplitude is approx. between 1 mm and 2 mm.

In an advantageous embodiment, the limiting member is configured as a conical shield. The conical configuration causes the membrane or absorber spring to abut against the conical shield in the first switching position and to be spaced from the limiting member in the second switching position.

Advantageously, the limiting member is fixed on the armature. For this purpose, the limiting member can be connected to the armature by positive, substance-to-substance and/or frictional engagement.

Further, the limiting member can fix the membrane on the armature by positive and/or frictional engagement. The absorber characteristic, i.e. the first and second natural absorber frequency, can be adjusted via the elastic compliance of the membrane, with the capability for vibrating of the armature relative to the partition being virtually exclusively determined by the spring properties of the membrane.

An opening can be introduced into the partition, with the opening, the elastic membrane and the armature defining the absorber channel. Advantageously, the membrane is connected to the partition with a first free end surrounding the opening and connected to the armature with a second free end, with the membrane closing the absorber channel in a liquid-tight manner. The armature may be disposed axially opposite from the working space.

In an advantageous embodiment, the electromagnet encloses a guide pin protruding in the axial direction, which reaches into a well of the armature in order to guide the armature in the axial direction. The axial guide causes the armature not to be able to execute any wobbling movements within the hydromount, thus being able only to move axially in the direction of the introduced vibrations. The jamming of the armature and an accompanying deactivation of the effect of the absorber channel is thus prevented.

Also advantageously, the electromagnet encloses a permanent magnet. By combining an electromagnet with a permanent magnet, a good fail-safe behavior is obtained. Above the idling speed of the mounted engine, the electromagnet is not supplied with current and is therefore not effective, so that the armature is locked in position by the permanent magnet. In engine idling or in a speed range close to idling, the electromagnet is supplied with current, and a magnetic field of the electromagnet counteracts the force of the permanent magnet. Thus, the armature is spaced from the electromagnet and is able to vibrate in the axial direction. Further, it is also possible to supply the electromagnet with current in order to lock the armature in place and to interrupt the current supply to the electromagnet for an arrangement of the armature so that it is capable of vibrating, with the force of the permanent magnet ensuring that the armature is spaced from the electromagnet.

Advantageously, the armature is made from a ferromagnetic material.

The electromagnet can be drivable by means of a direct current or alternating current. Operation with direct current enables a switching function on and off.

In an advantageous embodiment, the membrane is integrally connected to a cover membrane limiting the compensation chamber. The cover membrane accommodates the volume of the damping liquid displaced from the working space into the compensation chamber in a substantially pressureless manner.

Furthermore, the partition can be configured as an orifice cage and comprise two orifice disks, with a flexible elastic decoupling membrane being inserted between the orifice disks. The decoupling membrane causes the vibrations with high frequencies and low amplitudes, such as they occur, for example, in drive operation, to be decoupled. These are frequencies of approx. 50 to 100 Hz and amplitudes of approx. less than 0.1 mm.

The hydromount according to the invention is explained below in more detail with reference to an exemplary embodiment.

FIGS. 1 and 2 show a hydromount 10 according to the invention for a motor vehicle for damping the vibrations occurring during drive operation.

The hydromount 10 comprises a carrying mount 12 and a support mount 14, with the carrying mount 12 being supported by the support mount 14 via a suspension spring 16 made from an elastomeric material. The suspension spring 16 delimits a working chamber 18, which is separated from a compensation chamber 22 by a partition 20. In turn, the compensation chamber 22 is delimited by a cover membrane 24. Both chambers 18, 22 are filled with a fluid 26 and connected to each other in a liquid-conducting way via a damping channel 28 inserted into the partition 20.

The partition 20 is configured as an orifice cage 30 and has an upper orifice disk 32 and a lower orifice disk 34. A decoupling membrane 36 made from an elastic material is disposed between the two orifice disks 32, 34.

Furthermore, an opening 38 is introduced into the partition 20 in the direction of the axis of symmetry S of the hydromount. The opening 38 is surrounded by an elastic membrane 40, which is configured to be integral with the cover membrane 24 and extends away from the partition 20 in an opposite direction to the axial direction A. At its first free end 42, the membrane 40 is connected by a substance-to-substance connection, preferably vulcanized or glued, to an attachment member 44 connected to the partition 20. At its second free end 46, the membrane 40 is furthermore connected to an actuating device 48. The opening 38, the membrane 40 and the actuating device 48 together form an absorber channel 50.

The actuating device 48 has an armature 52 made from a ferromagnetic material, an electromagnet 54 and a permanent magnet 56. The armature 52 is connected to the second free end 46 of the membrane 40. The electromagnet 54 encloses the permanent magnet 56 and a guide pin 58 extending in the axial direction A. The guide pin 58 is inserted into a well 60 formed in the armature 52 in order to guide the armature 52 in case of movement in the axial direction A. The electromagnet 54 is firmly connected to the carrying mount 12 and is drivable via an electric line 62 leading out of the carrying mount 12.

In a first switching state, i.e. during drive operation, the electromagnet 54 is not supplied with current, so that the armature 52 is held on the electromagnet 54 by the magnetic force of the permanent magnet 56, as is shown in FIG. 1. In a second switching state, i.e. during engine idling, the electromagnet 54 is supplied with current. Thus, the latter generates a force that counteracts that of the permanent magnet 56, so that the armature lifts off 52 from the electromagnet 54 and is held by the membrane 40 in a position capable of vibrating.

The armature 52 further comprises a limiting member 64 configured as a conical shield 66 and surrounding the membrane 40. In the first switching state, the membrane 40 abuts against the shield 66, as is shown in FIG. 1. In the second switching state, the membrane 40 is spaced from the shield 66, as is shown in FIG. 2. The limiting member 64 can be connected to the armature 52 by positive, frictional and/or substance-to-substance engagement. Further, the limiting member 64 can be used to fix the membrane 40 on the armature 52.

The mode of operation of the hydromount according to the invention can be described as follows. The high-frequency vibrations with low amplitudes occurring during drive operation are insulated by the decoupling membrane 36. In the process, the decoupling membrane 36 inserted between the orifice disks 32, 34 vibrates in the direction of the introduced vibrations and thus decouples the damping action via the damping channel 28. Such vibrations imposed by the internal combustion engine are determined by the operating speed and the number of cylinders, i.e. of the exciting order. For example, the dominant exciting frequency of an engine with six cylinders and four-stroke cycle at 6000 r.p.m. is 300 Hz.

The low-frequency vibrations of approx. 10 Hz with high amplitude occurring during drive operation are damped by the damping channel 28. In the process, the fluid 26 flows back and forth from the working chamber 18 into the compensation chamber 22 via the damping channel 28. Due to the small diameter of the damping channel 28 and the high mechanical transmission associated therewith, large fluid masses become effective and thus, strong absorber effects of the fluid 26 in the damping channel 28 are made accessible. The introduced vibrations are damped therewith. In addition, the fluid absorber is effective also because of wall friction and the viscous properties of the fluid 26.

The vibrations occurring during idling are damped or absorbed by the absorber channel 50 and the armature 52, which is suspended in a manner capable of vibrating. For this purpose, the electromagnet 54 is supplied with current (second switching state), so that the magnetic field of the electromagnet 54 counteracts the force of the permanent magnet 56 and the armature 52 lifts off from the electromagnet 54 in the axial direction A, as illustrated in FIG. 2. Via the elastic membrane 40, the armature 52 is suspended in a manner capable of vibrating, and vibrates together with the liquid column in the absorber channel 50, in order thus to dampen or absorb the vibrations imposed during idling.

As was already explained above, the membrane 40 is spaced from the limiting member 64 in the second switching state. Thus, both the axial spring rate of the membrane 40 parallel to the axis of symmetry S of the hydromount and the expanding-spring rate of the membrane 40 are effective. In this case, the first absorber mass is formed by the fluid 26 in the absorber channel 50, and the second absorber mass corresponds to the armature 52. The first natural absorber frequency of the first absorber mass is derived from the fluid mass in the absorber channel 50, the expanding-spring rate of the suspension spring 16 and the expanding-spring rate of the membrane 40. The second natural absorber frequency of the second absorber mass is derived from the axial spring rate of the membrane 40 and the mass of the armature 52. In this case, the natural absorber frequencies can be adjusted in such a way that the dynamic spring rate of the hydromount 10 during the idling of the engine is considerably lowered at the most important exciting frequencies. For example, these frequencies, in a six-cylinder engine of the third and sixth order and in a four-cylinder engine of the second and fourth order, are 35 to 40 Hz and 70 to 80 Hz. Furthermore, the axial spring rate of the membrane 40 and its expanding-spring rate are subject to mechanical transmission. The mechanical transmission results from the relation of the hydraulic effective area of the suspension spring 16 to the hydraulic effective area of the membrane 40. Transmissions in coupled mechanical systems are effective with the square of the transmission ratio. In the present case, the square of the transmission ratio is approximately between 80 and 120, preferably approximately 100. Thus, a high effective level of the vibrating absorber masses is obtained, so that the high-frequency vibrations occurring during idling are absorbed. Thus, the dynamic spring rate of the hydromount 10 during idling can be lowered considerably at the most important exciting frequencies.

In a first switching state, i.e. during drive operation, the electromagnet is not supplied with current, so that the armature 52 abuts against the electromagnet 54 due to the magnetic force of the permanent magnet 56. As is apparent from FIG. 1, the membrane 40 abuts against the limiting member 64 and is unable to vibrate in a resonant manner. Thus, the volume compliance of the membrane 40 is disabled, so that the bearing behavior of a conventional hydromount is obtained, by damping taking place by means of a liquid exchange between the working chamber 16 and the compensation chamber 22 via the damping channel 28. In particular, the membrane 40, due to being abutted against the limiting member 64, has no influence on the damping of the vibrations occurring outside the idling of the engine, such as, for example, for judder damping.

The hydromount 10 according to the invention is characterized by the arrangement of a limiting member 64, which surrounds the membrane 40 and is configured as a conical shield 66. In the first switching state, i.e. during drive operation, the membrane 40 can abut against the limiting member 64, so that the membrane 40 is unable to vibrate in a resonant manner. Thus, the volume compliance of the absorber spring is disabled, so that the bearing behavior of a conventional hydromount is obtained. In particular, the membrane 40, due to being abutted against the limiting member 64, has no influence on the damping of the vibrations occurring outside the idling of the engine, such as, for example, for judder damping. In the second switching state, the membrane 40 is spaced from the limiting member 64. Thus, both the axial spring rate of the membrane 40 parallel to the axis of symmetry S of the hydromount and the expanding-spring rate of the membrane 40 are effective. This results in a high mechanical transmission and, associated therewith, a significant lowering of the dynamic spring rate of the hydromount 10 at the most important exciting frequencies during engine idling.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGN LIST

10 Hydromount
12 Carrying mount
14 Support mount
16 Suspension spring
18 Working chamber
20 Partition
22 Compensation chamber
24 Cover membrane
26 Fluid
28 Damping channel
30 Orifice cage
32 Upper orifice disk
34 Lower orifice disk
36 Decoupling membrane
38 Opening
40 Elastic membrane
42 First free end
44 Attachment member
46 Second free end
48 Actuating device
50 Absorber channel
52 Armature
54 Electromagnet
56 Permanent magnet
58 Guide pin
60 Well
62 Electric line
64 Limiting member
66 Conical shield
S Axis of symmetry of the hydromount
A Axial direction

The invention claimed is:

1. A hydromount comprising:
a carrying mount and a support mount connected to each other by an elastomeric suspension spring;
a working chamber and a compensation chamber, the working chamber and the compensation chamber being filled with a fluid and separated from each other by a partition and connected to each other via a damping channel inserted into the partition; and
an absorber channel, which is switchable via an actuating device, wherein the absorber channel is inactive in a first switching position of the actuating device and the absorber channel is active in a second switching position of the actuating device, and wherein the actuating device has an electrically drivable electromagnet and an armature which is suspended via an elastic membrane so as to allow the armature to vibrate, wherein the membrane is surrounded by a limiting member configured such that the membrane abuts against the limiting member in the first switching position and is spaced from the limiting member in the second switching position.

2. The hydromount according to claim 1, wherein the limiting member is configured as a conical shield.

3. The hydromount according to claim 1, wherein the limiting member is fixed to the armature.

4. The hydromount according to claim 1, wherein the limiting member fixes the membrane on the armature by at least one of a positive frictional engagement.

5. The hydromount according to claim 1, wherein an opening is disposed in the partition, and wherein the opening, the elastic membrane and the armature define the absorber channel.

6. The hydromount according to claim 1, wherein the electromagnet encloses a guide pin protruding in an axial direction, and wherein the guide pin reaches into a well of the armature so as to guide the armature in the axial direction.

7. The hydromount according to claim 1, wherein the armature is made from a ferromagnetic material.

8. The hydromount according to claim 1, wherein the electromagnet encloses a permanent magnet.

9. The hydromount according to claim 1, wherein the electromagnet is drivable via at least one of a direct current or an alternating current.

10. The hydromount according to claim 1, wherein the membrane is integrally connected to a cover membrane so as to limit the compensation chamber.

11. The hydromount according claim 1, wherein the partition is configured as an orifice cage and comprises two orifice disks, with a flexible elastic decoupling membrane being inserted between the orifice disks.

12. The hydromount according to claim 1, wherein the hydromount is a switchable hydromount.

\* \* \* \* \*